Figure 1:
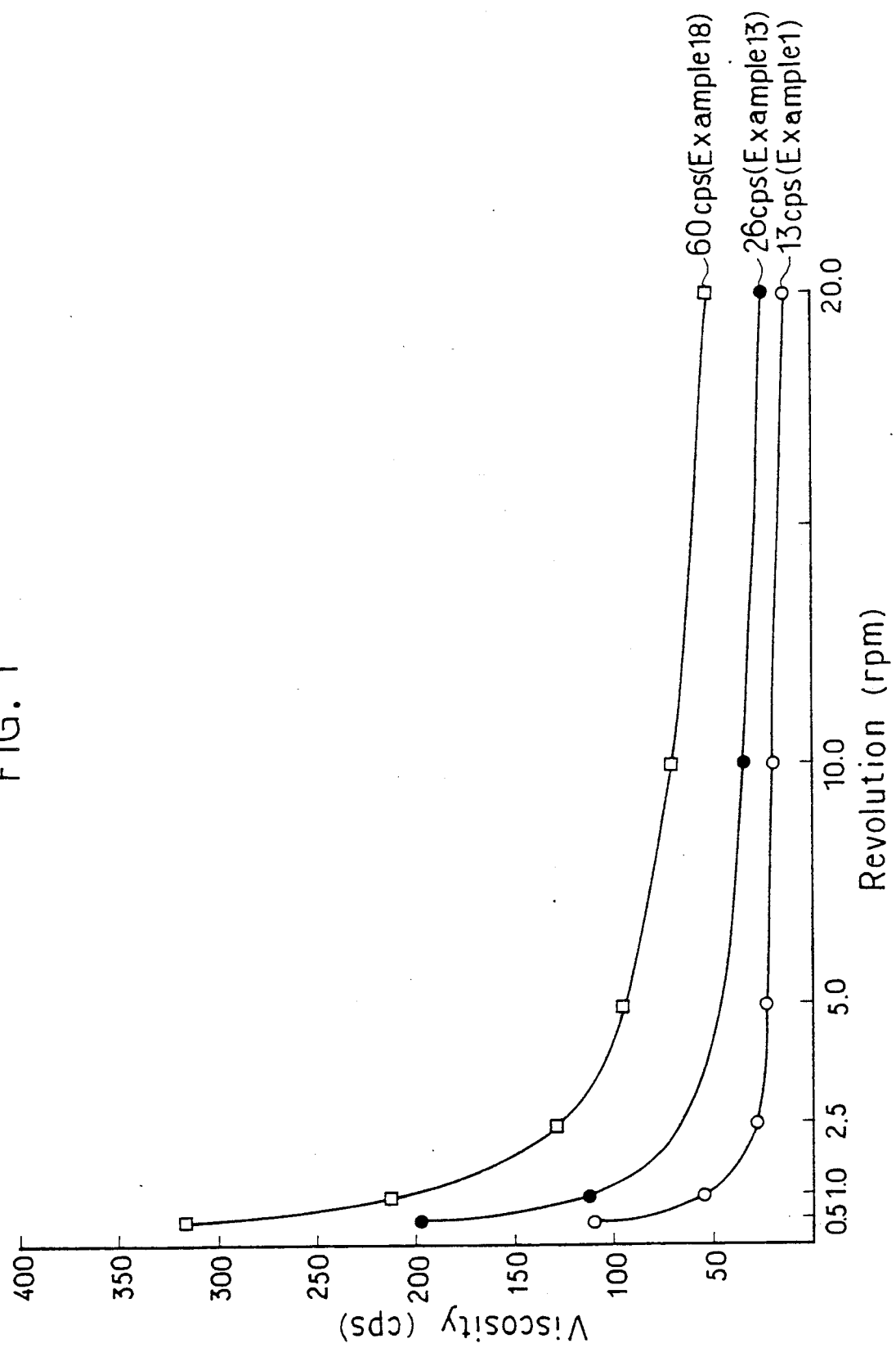

United States Patent [19]

Uzukawa et al.

[11] Patent Number: 5,120,359
[45] Date of Patent: Jun. 9, 1992

[54] ERASABLE INK COMPOSITIONS

[75] Inventors: Shingo Uzukawa, Kashiwara; Yukito Shoji, Suita, both of Japan

[73] Assignee: Sakura Color Products Corporation, Osaka, Japan

[21] Appl. No.: 434,678

[22] PCT Filed: Feb. 22, 1989

[86] PCT No.: PCT/JP89/00181
 § 371 Date: Oct. 26, 1989
 § 102(e) Date: Oct. 26, 1989

[87] PCT Pub. No.: WO89/08134
 PCT Pub. Date: Sep. 8, 1989

[30] Foreign Application Priority Data

Feb. 26, 1988 [JP] Japan .................... 63-45341
Feb. 26, 1988 [JP] Japan .................... 63-45342

[51] Int. Cl.$^5$ ......................................... C09D 11/10
[52] U.S. Cl. ........................................ 106/20; 106/499; 106/500; 523/161; 523/160; 523/205; 524/560; 524/561; 524/562; 524/563; 524/575; 524/577
[58] Field of Search ............... 106/20, 23, 499, 500; 523/161, 160, 205, 377, 388; 524/560, 561, 562, 563, 575, 577

[56] References Cited

U.S. PATENT DOCUMENTS

| | | | |
|---|---|---|---|
| 3,458,804 | 7/1969 | Wolf et al. | 106/500 |
| 3,925,094 | 12/1975 | Papenfuss et al. | 106/500 |
| 3,925,096 | 12/1975 | Karkov | 524/563 |
| 4,014,844 | 3/1977 | Vidal et al. | 524/560 |
| 4,036,652 | 7/1977 | Rothmayer | 524/560 |
| 4,235,768 | 11/1980 | Ritter et al. | 524/560 |
| 4,365,035 | 12/1982 | Zabiak | 523/160 |
| 4,525,216 | 6/1985 | Nakanishi | 106/30 |
| 4,530,961 | 7/1985 | Nguyen et al. | 523/160 |
| 4,636,258 | 1/1987 | Hayashi et al. | 523/160 |
| 4,665,107 | 5/1987 | Micale | 523/161 |
| 4,680,058 | 7/1987 | Shimizu et al. | 523/160 |
| 4,687,789 | 8/1987 | Gonnett et al. | 524/560 |
| 4,713,411 | 12/1987 | Kanou et al. | 524/560 |
| 4,833,197 | 5/1989 | Schelhaas et al. | 523/160 |

Primary Examiner—William R. Dixon, Jr.
Assistant Examiner—Helene Klemanski
Attorney, Agent, or Firm—Larson and Taylor

[57] ABSTRACT

The present invention provides:
(1) an ink composition erasable with a rubber eraser, the composition comprising 1 to 50% of a pigment, 3 to 50% of a resin having a film-forming temperature of 40° C. or higher, 0.5 to 50% of an organic solvent and 7 to 60% of water, based on the weight of the ink composition;
(2) an ink composition erasable with a rubber eraser, the composition comprising 2 to 90% of a pigment coated with a resin having a film-forming temperature of 40° C. or higher, 0.5 to 30% of an organic solvent and 0.5 to 30% of water, based on the weight of the ink composition; and
(3) an ink composition erasable with a rubber eraser, the composition comprising 2 to 90% of a pigment coated with a resin having a film-forming temperature of 40° C. or higher, 1.5 to 55% of an emulsion (calculated as solids), 0.5 to 30% of an organic solvent and 4.0 to 60% of water, based on the weight of the ink composition.

15 Claims, 1 Drawing Sheet

ERASABLE INK COMPOSITIONS

The present invention relates to ink compositions and more particularly to ink compositions erasable with a rubber eraser after writing.

PRIOR ART AND ITS PROBLEMS

Ink compositions erasable with a rubber eraser after writing (hereinafter referred to as "erasable ink") are known. For example, Japanese Unexamined Patent Publication No.59-223,769 discloses an "ink composition characterized in that it is prepared by uniformly dispersing a pigment selected from carbon black and aniline black in an aqueous medium having dissolved therein polyethylene oxide in the presence of a surfactant containing polyoxyethylene groups". However, the disclosed erasable ink is poor in stability, unsatisfactory in erasability, and difficult to erase in a long period after writing. Other erasable inks of various compositions heretofore proposed are insufficient in at least one of shelf life, erasability, fluidity and the like required of erasable inks, and thus all of them fail to achieve the desired results.

MEANS FOR RESOLVING THE PROBLEMS

In view of the foregoing present situation of the prior art, we conducted extensive research and found that the compositions which contain a resin having a specific minimum film-forming temperature or glass transition point (hereinafter referred to merely as "film-forming temperature") can alleviate the problems of conventional erasable inks to a great extent. According to the present invention, there is provided the following erasable ink:

(1) an ink composition erasable with a rubber eraser, the composition comprising 1 to 50% of a pigment, 3 to 50% of a resin having a film-forming temperature of 40° C or higher, 0.5 to 50% of an organic solvent and 7 to 60% of water, based on the weight of the ink composition (hereinafter referred to as "composition I").

Our research revealed that the ink compositions which contain pigment particles coated with a resin having a specific film-forming temperature can also sufficiently mitigate the problems of conventional erasable inks. According to the present invention, there are also provided the following ink compositions:

(2) an ink composition erasable with a rubber eraser, the composition comprising 2 to 90% of a pigment coated with a resin having a film-forming temperature of 40° C or higher, 0.5 to 30% of an organic solvent and 0.5 to 30% of water, based on the weight of the ink composition (hereinafter referred to as "composition II"), and (3) an ink composition erasable with a rubber eraser, the composition comprising 2 to 90% of a pigment coated with a resin having a film-forming temperature of 0° C or higher, 1.5 to 55% of an emulsion (calculated as solids), 0.5 to 30% of an organic solvent and 4.0 to 60% of water, based on the weight of the ink composition (hereinafter referred to as "composition III").

The term "minimum film-forming temperature" (or "MFT") used herein refers to a minimum temperature for forming a coating film from an emulsion, namely a threshold temperature above which a film can be formed but below which a film can not be formed.

The compositions I, II and III will be described below in detail.

1. Composition I

Pigments useful for the erasable composition I of the invention are not specifically limited. Pigments commonly employed for writing inks are usable singly or at least two of them can be used in mixture. Examples of usable pigments are shown below according to the color index (C.I.) number.

Inorganic pigment (a) Pigment Black 6, 7, 9, 10
(b) Pigment Red 101, 105, 106, 107, 108
(c) Pigment Blue 27, 28, 29, 35
(d) Pigment Green 17. 18, 19, 21

Organic pigment (a) Pigment Black 1
(b) Pigment Red 1, 2, 3, 4, 5, 7, 9, 12, 22
(c) Pigment Blue 1, 2, 15, 16, 17
(d) Pigment Green 2, 7, 8, 10

The resin component for the erasable ink composition I of the invention is selected for use from acrylic resins, acryl-styrene copolymer resins, ethylene-vinyl acetate-vinyl chloride copolymer resins, acryl-vinyl acetate copolymer resins, carboxylated butadiene-styrene rubber, styrene resins and the like which have a film-forming temperature of 40° C. or higher. Preferred resins have a film-forming temperature of 50° C. or higher. The resins with a film-forming temperature of lower than 40° C. partially form a resin film even at room temperature during the storage of ink, or result in the formation of a resin film by the frictional heat generated on rubbing of writing with a rubber eraser to strengthen the adhesion between the writing and paper, thereby making impossible erasure with the rubber eraser. These resins are commercially available in the form of an emulsion having a solids concentration of about 30 to about 60% by weight, and are therefore usable as they are. When required, at least two of these resins can be used in mixture.

Organic solvents useful for the erasable ink composition I of the invention are not specifically limited and can be any of solvents commonly employed for writing inks. Examples of useful organic solvents are ethylene glycol, propylene glycol, hexylene glycol and like alkylene glycols; diethylene glycol, dipropylene glycol and like dialkylene glycols; polyethylene glycol, polypropylene glycol and like polyalkylene glycols; glycerins; etc. When required, two or more solvents can be used in mixture.

The proportions of the components for the erasable ink composition I of the invention are required to fall in the following ranges based on the weight of the composition.

The proportion of the pigment is 1 to 50%, preferably 5 to 30%. Less than 1% of the pigment used renders the ink unsuitable for use because of the resulting low density of writing, whereas more than 50% of the pigment used decreases the dispersion stability, making difficult the removal of writing.

The proportion of the resin component, calculated as solids, is 3 to 50%, preferably 10 to 45%. Less than 3% of the resin component used fails to form a film containing a sufficient amount of particulate resin on the surface of a writing sheet, making it impossible to completely erase the writing by removing the particulate resin layer enclosing therein the pigment. On the other hand, more than 50% of the resin component used excessively increases the viscosity of the ink, making difficult the release of ink from the container.

The proportion of the organic solvent is 0.5 to 50%, preferably 10 to 30%. Less than 0.5% of the solvent used shortens the long-term shelf life of the ink, whereas more than 50% of the solvent used increases the permeability of ink with respect to paper so highly as to permit the penetration of pigment into the paper, making complete erasure difficult.

The water is used in a proportion of 7 to 60% inclusive of the portion of water derived from the resin component used in the form of an emulsion. In case water is added to the portion of water resulting from the emulsion, ion exchange water is used.

The erasable ink composition I of the invention can be prepared by an optional method which can homogeneously disperse the components. Stated more specifically, the ink is prepared, for example, by kneading the pigment and the resin emulsion to obtain a pigment paste, adding an organic solvent and water to the paste and stirring the mixture.

2. Composition II L- Pigments useful for the erasable ink composition II of the invention can be any of pigments commonly used for writing inks. These pigments are coated with a resin having a film-forming temperature of 40° C. or higher. Useful common pigments may be those usable for the composition I.

The resin component for coating such common pigment is selected, as is the resin component for the composition I, from acrylic resins, acryl-styrene copolymer resins, ethylene-vinyl acetate-vinyl chloride copolymer resins, acryl-vinyl acetate copolymer resins, carboxylated butadiene-styrene rubber, styrene resins and the like which have a film-forming temperature of 40° C. or higher. Preferred resins have a film-forming temperature of 50° C. or higher. The resins with a film-forming temperature of lower than 40° C. partially form a resin film even at room temperature during the storage of ink, or result in the formation of a resin film by the frictional heat generated on rubbing of writing with a rubber eraser to provide a strong adhesion between the writing and the paper, making impossible erasure with a rubber eraser.

The resin-coated pigment useful for the erasable ink composition II of the invention can be easily obtained by conventional methods, e.g., by homogeneously coagulating the pigment and the resin. The pigment : resin ratio (weight ratio) of useful resin-coated pigment is approximately 40-95 : 60-5. Preferred particles of resin-coated pigment have a mean particle size of about 0.1 to about 10 μm in view of excellent stability to dispersion in the ink composition, erasability, fluidity at the pen tip and the like. When required, at least two of resin-coated pigments can be used in mixture.

The organic solvents usable for the composition I can be used for the composition II.

The proportions of the components for the erasable ink composition II according to the invention need to fall in the following ranges based on the weight of the composition.

The proportion of the resin-coated pigment is 2 to 90%, preferably about 10 to about 70%. Less 2% of the pigment used makes the ink unsuited for use because of the resulting low density of writing, whereas more than 90% thereof used decreases the dispersion stability, making erasure difficult.

The proportion of the organic solvent is 0.5 to 30%, preferably about 1 to about 20%. Less than 0.5% of the organic solvent used shortens the long-term shelf life of the ink, whereas over 30% thereof used so highly increases the permeability of ink with respect to paper as to permit the penetration of ink into paper, making complete removal difficult.

The proportion of the water is 0.5 to 30%, and ion exchange water is used.

The erasable ink composition II according to the invention can be prepared by an optional method which can homogeneously disperse the components. For example, the desired composition II can be formulated by stirring a mixture of the resin-coated pigment, organic solvent and water until they become homogeneously dispersed.

3. Composition III

The composition III contains a resin emulsion in addition to the same three components as in the composition II. The foregoing resins useful for coating the pigment can be employed as the resin in the emulsion. The proportion of the resin emulsion is 1.5 to 55%, preferably 2 to 50%, calculated as solids. If the resin is used in this proportion range, a uniform coating of resin particles enclosing therein the pigment particles is formed on the surface of a writing sheet, and the removal of the pigment-enclosing resin coating assures and facilitates complete erasure of writing. More than 55% of the resin component used excessively increases the viscosity of ink, making difficult the flow of ink out of the container. In view of using the emulsion, water is used in an amount of 4 to 60% inclusive of the portion of water derived from the emulsion.

The ratio of the resin-coated pigment to the organic solvent is the same as in the composition II.

The composition III is prepared by the same method as the composition II.

The erasable inks of the invention have a low viscosity (about 10 to about 100 cps: measuring conditions; an ELD-type viscometer, 3° cone, 20° C., 20 rpm), and an excellent storage stability so that they can be used in the same manner as usual writing inks for ball point pens, marking pens and so on unlike conventional erasable inks which require a pressure-type container.

EFFECTS OF THE INVENTION

Since the erasable inks of the invention exhibit a low permeability with respect to the surface of a writing sheet (e.g. paper) and the pigment is retained within the layer of particulate resin formed on the surface of the writing sheet, the writing can be extremely easily erased with a rubber eraser. Further the erasable inks of the invention sustain the good erasability for a long period because of their high storage stability.

EXAMPLES

Given below are Examples to clarify the features of the invention with reference to the drawings.

FIG. 1 is a graph showing the viscosity of the inks prepared in the Examples illustrative of the invention.

The word "parts" used in Examples are all by weight. The amount of the resin is expressed in terms of the amount of the emulsion, and the amount of the water in terms of the amount of ion exchange water added.

EXAMPLE 1

The erasable ink composition of the invention was prepared from the following components.

| | |
|---|---|
| Carbon black | 5 parts |
| (C.I. Pigment Black 7) | |
| Acryl-styrene copolymer resin emulsion (*1) | 80 parts |
| Ethylene glycol | 7 parts |
| Water | 8 parts |

Note:
*1 Trademark "Movinyl 970," 100° C. in film-forming temperature, 40% in solids concentration, product of Hoechst Synthesis Co., Ltd.

In preparing the ink, the carbon black and the resin emulsion were kneaded by a three-roll mill to obtain a pigment paste. Ethylene glycol and ion exchange water were added to the paste and the mixture was stirred, giving the ink of the invention.

Writing was produced using a ball point pen charged with the obtained ink. The layer (writing) was dried and the dried writing was completely removed on rubbing with a usual eraser.

Writing produced using a ball point pen charged with the obtained ink was left to stand for 30 days at 25° C. and tested for erasability in the same manner as above. The writing was completely erased as in the above test.

EXAMPLE 2

The erasable ink of the invention was prepared by carrying out the same procedure as in Example 1 using the following components.

| | |
|---|---|
| Carbon black | 7 parts |
| (C.I. Pigment Black 7) | |
| Acryl-styrene copolymer resin emulsion (*2) | 68 parts |
| Glycerin | 11 parts |
| Water | 14 parts |

Note:
*2 Trademark "Polysol AT-2011," 100° C. in film-forming temperature, 50% in solids concentration, product of Showa Highpolymer Co., Ltd.

The obtained ink had a higher erasability and higher storage stability than the ink prepared in Example 1.

EXAMPLE 3

The erasable ink of the invention was prepared by carrying out the same procedure as in Example 1 using the following components.

| | |
|---|---|
| Carbon black | 7 parts |
| (C.I. Pigment Black 7) | |
| Acryl-styrene copolymer resin emulsion (*3) | 74 parts |
| Propylene glycol | 7 parts |
| Water | 12 parts |

Note:
*3 Same as in Example 1.

The obtained ink had a higher erasability and higher storage stability than the ink prepared in Example 1.

EXAMPLE 4

The erasable ink of the invention was prepared by carrying out the same procedure as in Example 1 using the following components.

| | |
|---|---|
| Carbon black | 6 parts |
| (C.I. Pigment Black 7) | |
| Acrylic resin emulsion (*4) | 71 parts |
| Diethylene glycol | 8 parts |
| Water | 15 parts |

Note:
*4 Trademark "Movinyl 742," 50° C. in film-forming temperature, 46% in solids concentration, product of Hoechst Synthesis Co., Ltd.

The obtained ink had a higher erasability and higher storage stability than the ink prepared in Example 1.

EXAMPLE 5

The erasable ink of the invention was prepared by carrying out the same procedure as in Example 1 using the following components.

| | |
|---|---|
| Carbon black | 5 parts |
| (C.I. Pigment Black 7) | |
| Acryic resin emulsion (*5) | 68 parts |
| Polyethylene glycol (molecular weight: 200) | 12 parts |
| Water | 15 parts |

Note:
*5 Trademark "Acryset IIE", 50° C. in film-forming temperature, 42% in solids concentration, product of Japan Catalytic Chemical Industry Co., Ltd.

The obtained ink had a higher erasability and higher storage stability than the ink prepared in Example 1.

EXAMPLE 6

The erasable ink of the invention was prepared by carrying out the same procedure as in Example 1 using the following components.

| | |
|---|---|
| Carbon black | 8 parts |
| (C.I. Pigment Black 7) | |
| Acryl-styrene copolymer resin emulsion (*6) | 65 parts |
| Glycerin | 11 parts |
| Water | 13 parts |

Note:
*6 Same as in Example 2.

The obtained ink had a higher erasability and higher storage stability than the ink prepared in Example 1.

EXAMPLE 7

The erasable ink of the invention was prepared by carrying out the same procedure as in Example 1 using the following components.

| | |
|---|---|
| Carbon black | 9 parts |
| (C.I. Pigment Black 7) | |
| Styrene resin emulsion (*7) | 68 parts |
| Ethylene glycol | 9 parts |
| Water | 14 parts |

Note:
*7 Trademark "Polysol C-10," 100° C. in film-forming temperature, 49% in solids concentration, product of Showa Highpolymer Co., Ltd.

The obtained ink had a higher erasability and higher storage stability than the ink prepared in Example 1.

EXAMPLE 8

The erasable ink of the invention was prepared by carrying out the same procedure as in Example 1 using the following components.

| | |
|---|---|
| Carbon black | 6 parts |
| (C.I. Pigment Black 7) | |
| Acryl-vinyl acetate copolymer resin emulsion (*8) | 72 parts |

-continued

| | |
|---|---|
| Glycerin | 9 parts |
| Water | 13 parts |

Note:
*8 Trademark "Polysol AT-1000." 45° C. in film-forming temperature, 50% in solids concentration, product of Showa Highpolymer Co., Ltd.

The obtained ink had a higher erasability and higher storage stability than the ink prepared in Example 1.

EXAMPLE 9

The erasable ink of the invention was prepared by carrying out the same procedure as in Example 1 using the following components.

| | |
|---|---|
| Carbon black (C.I. Pigment Black 7) | 9 parts |
| Acryl-styrene copolymer resin emulsion (*9) | 64 parts |
| Ethylene glycol | 12 parts |
| Water | 15 parts |

Note:
*9 Same as in Example 1.

The obtained ink had a higher erasability and higher storage stability than the ink prepared in Example 1.

COMPARATIVE EXAMPLE 1

The erasable ink for comparison was prepared from the following components.

| | |
|---|---|
| Carbon black (C.I. Pigment Black 7) | 7 parts |
| Acryl-styrene copolymer resin emulsion (*10) | 70 parts |
| Ethylene glycol | 10 parts |
| Water | 13 parts |

Note:
*10 Trademark "Movinyl 748." 10° C. in film-forming temperature, 45% in solids concentration, product of Hoechst Synthesis Co., Ltd.

Since the resin emulsion used had too a low film-forming temperature, a resin film was formed on the surface of paper, causing the writing to strongly adhere to the paper with the result that the writing formed from the obtained ink was not removed with a rubber eraser.

COMPARATIVE EXAMPLE 2

The erasable ink for comparison was prepared from the following components.

| | |
|---|---|
| Carbon black (C.I. Pigment Black 7) | 8 parts |
| Acryl-styrene copolymer resin emulsion (*11) | 69 parts |
| Glycerin | 8 parts |
| Water | 15 parts |

Note:
*11 Trademark "Movinyl 670," 20° C. in film-forming temperature, 45% in solids concentration, product of Hoechst Synthesis Co., Ltd.

Since the resin emulsion used had too a low film-forming temperature, a resin film was formed on the surface of paper, causing the writing to strongly adhere to the paper with the result that the writing formed from the obtained ink was not removed with a rubber eraser.

EXAMPLE 10

The erasable ink of the invention was prepared by carrying out the same procedure as in Example 1 using the following components.

| | |
|---|---|
| Permanent Red 4R (C.I. Pigment Red 3) | 8 parts |
| Acryl-styrene copolymer resin emulsion (*12) | 75 parts |
| Propylene glycol | 8 parts |
| Water | 9 parts |

Note:
*12 Same as in Example 1.

The obtained ink had a higher erasability and higher storage stability than the ink prepared in Example 1.

EXAMPLE 11

The erasable ink of the invention was prepared by carrying out the same procedure as in Example 1 using the following components.

| | |
|---|---|
| Phthalocyanine Blue (C.I. Pigment Blue 15) | 22 parts |
| Styrene resin emulsion (*13) | 59 parts |
| Polyethylene glycol (Molecular weight: 400) | 7 parts |
| Water | 12 parts |

Note:
*13 Same as in Example 7.

The obtained ink had a higher erasability and higher storage stability than the ink prepared in Example 1.

EXAMPLE 12

The erasable ink of the invention was prepared by carrying out the same procedure as in Example 1 using the following components.

| | |
|---|---|
| Phthalocyanine Green (C.I. Pigment Green 7) | 20 parts |
| Acryl-styrene copolymer resin emulsion (*14) | 52 parts |
| Diethylene glycol | 7 parts |
| Water | 15 parts |

Note:
*14 Same as in Example 2

The obtained ink had a higher erasability and higher storage stability than the ink prepared in Example 1.

EXAMPLE 13

The erasable ink of the invention was prepared from the following components.

| | |
|---|---|
| Resin-coated pigment (Black) | 70 parts |
| Acryl-styrene copolymer resin emulsion (*15) | 5 parts |
| Ethylene glycol | 5 parts |
| Water | 20 parts |

Note:
*15 Same as in Example 1.

The resin-coated pigment used in this example and to be used in Examples 14 to 22 was prepared by a homogeneously coagulating method using C. I. Pigment Black 11 as a black pigment and acryl-styrene copolymer resin emulsion (same as above) in equal amounts (calculated as solids). The pigment particles had a mean particle size of about 1 μm.

In preparing the ink, the resin-coated pigment and the resin emulsion were kneaded by a three-roll mill to obtain a pigment paste. Ethylene glycol and ion exchange water were added to the paste and the mixture was stirred, giving the ink of the invention.

The obtained ink was charged into an ink-storing container, and writing was produced. The writing was dried, and the dried writing was completely removed on rubbing with a usual rubber eraser.

Further, the obtained ink was charged into an ink-storing container and left to stand at 25° C. for 30 days. Writing was produced and the writing was tested for erasability in the same manner as above. The ink was as erasable as above.

EXAMPLE 14

The erasable ink of the invention was prepared by carrying out the same procedure as in Example 13 using the following components.

| Resin-coated pigment | 70 parts |
| --- | --- |
| Acryl-styrene copolymer resin emulsion (*16) | 5 parts |
| Ethylene glycol | 5 parts |
| Water | 20 parts |

Note:
*16 Trademark "Movinyl 972," 100° C. in film-forming temperature, 50% in solids concentration, product of Hoechst Synthesis Co., Ltd.

The obtained ink had a higher erasability and higher storage stability than the ink prepared in Example 13.

EXAMPLE 15

The erasable ink of the invention was prepared by carrying out the same procedure as in Example 13 using the following components.

| Resin-coated pigment | 76 parts |
| --- | --- |
| Acryl-styrene copolymer resin emulsion (*17) | 9 parts |
| Glycerin | 4 parts |
| Water | 11 parts |

Note:
*17 Same as in Example 1.

The obtained ink had a higher erasability and higher storage stability than the ink prepared in Example 13.

EXAMPLE 16

The erasable ink of the invention was prepared by carrying out the same procedure as in Example 13 using the following components.

| Resin-coated pigment | 70 parts |
| --- | --- |
| Acryl-styrene copolymer resin emulsion (*18) | 5 parts |
| Ethylene glycol | 5 parts |
| Water | 20 parts |

Note:
*18 Same as in Example 2.

The obtained ink of had a higher erasability and higher storage stability than the ink prepared in Example 1.

EXAMPLE 17

The erasable ink of the invention was prepared by carrying out the same procedure as in Example 13 using the following components.

| Resin-coated pigment | 70 parts |
| --- | --- |
| Acryl-styrene copolymer resin emulsion (*19) | 5 parts |
| Ethylene glycol | 5 parts |
| Water | 20 parts |

Note:
*19 Same as in Example 1.

The obtained ink had a higher erasability and higher storage stability than the ink prepared in Example 13.

EXAMPLE 18

The erasable ink of the invention was prepared by carrying out the same procedure as in Example 13 using the following components.

| Resin-coated pigment | 65 parts |
| --- | --- |
| Acryl-styrene copolymer resin emulsion (*20) | 14 parts |
| Propylene glycol | 7 parts |
| Water | 14 parts |

Note:
*20 Same as in Example 1.

The obtained ink had a higher erasability and higher storage stability than the ink prepared in Example 13.

EXAMPLE 19

The erasable ink of the invention was prepared by carrying out the same procedure as in Example 13 using the following components.

| Resin-coated pigment | 56 parts |
| --- | --- |
| Acryl-styrene copolymer resin emulsion (*21) | 23 parts |
| Diethylene glycol | 7 parts |
| Water | 14 parts |

Note:
*21 Same as in Example 14.

The obtained ink had a higher erasability and higher storage stability than the ink prepared in Example 13.

EXAMPLE 20

The erasable ink of the invention was prepared by carrying out the same procedure as in Example 1 using

| Resin-coated pigment | 62 parts |
| --- | --- |
| Styrene resin emulsion (*22) | 24 parts |
| Polyethylene glycol (molecular weight: 400) | 5 parts |
| Water | 9 parts |

Note:
*22 Same as in Example 7.

The obtained ink had a higher erasability and higher storage stability than the ink prepared in Example 13.

EXAMPLE 21

The erasable ink of the invention was prepared by carrying out the same procedure as in Example 13 using the following components.

| | |
|---|---|
| Resin-coated pigment | 10 parts |
| Acryl-styrene copolymer resin emulsion (*23) | 58 parts |
| Hexylene glycol | 4 parts |
| Water | 28 parts |

Note:
*23 Same as in Example 1.

The obtained ink had a higher erasability and higher storage stability than the ink prepared in Example 13.

EXAMPLE 22

The erasable ink of the invention was prepared by carrying out the same procedure as in Example 13 using the following components.

| | |
|---|---|
| Resin-coated pigment | 7 parts |
| Acryl-vinyl acetate copolymer resin emulsion (*24) | 67 parts |
| Ethylene glycol | 4 parts |
| Water | 22 parts |

Note:
*24 Same as in Example 8.

The obtained ink had a higher erasability and higher storage stability than the ink prepared in Example 13.

EXAMPLE 23

The erasable ink of the invention was prepared by carrying out the same procedure as in Example 13 using the following components. The resin-coated pigment used in this example was prepared by a homogeneously coagulating method, using C.I. Pigment Red 101 as a red pigment and acryl-styrene copolymer resin emulsion (same as below) in equal amounts (calculated as solids). The pigment particles had a mean particle size of about 0.7 μm.

| | |
|---|---|
| Resin-coated pigment | 24 parts |
| Acryl-styrene copolymer resin emulsion (*25) | 48 parts |
| Ethylene glycol | 9 parts |
| Water | 19 parts |

Note:
*25 Same as in Example 1.

The obtained ink had a higher erasability and higher storage stability than the ink prepared in Example 13.

EXAMPLE 24

The erasable ink of the invention was prepared by carrying out the same procedure as in Example 1 using the following components. The resin-coated pigment used in this example was prepared by a homogeneously coagulating method using C.I. Pigment Blue 27 as a blue pigment and styrene resin emulsion (same as below) in equal amounts (calculated as solids). The pigment particles had a mean particle size of about 2 μm.

| | |
|---|---|
| Resin-coated pigment | 13 parts |
| Styrene resin emulsion (*26) | 62 parts |
| Glycerin | 10 parts |
| Water | 15 parts |

Note:
*26 Same as in Example 7.

The obtained ink had a higher erasability and higher storage stability than the ink prepared in Example 13.

EXAMPLE 25

Each ink obtained above was tested for erasability according to the erasability (rate of erasure) test prescribed in JIS S6227.

Table 1 b below shows the results.

The results show that the inks of the present invention prepared in the Examples had much higher erasability than the inks prepared in the Comparative Examples.

TABLE 1

| Example | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | Comp. Ex. | 1 | 2 |
|---|---|---|---|---|---|---|---|---|---|---|---|---|---|---|---|---|---|---|---|---|---|---|---|---|---|---|---|
| Rate of erasure (%) | 85 | 84 | 86 | 79 | 81 | 85 | 83 | 81 | 84 | 83 | 84 | 85 | 89 | 93 | 94 | 93 | 93 | 98 | 97 | 96 | 95 | 97 | 93 | 94 | | 35 | 41 |

EXAMPLE 26

The viscosity of the inks obtained in Examples 1, 13 and 18 was measured using an ELD-type viscometer with 3" cone at 20° C.

FIG. 1 shows the relationship between the revolution (r.p.m.) and the viscosity (cps).

We claim:

1. An ink composition erasable with a rubber eraser after writing, the composition comprising, based on the weight of the ink composition, 1 to 50% of a pigment, 3 to 50% of a water insoluble resin having a film-forming temperature of 40° C. or higher, 0.5 to 50% of at least one organic solvent selected from the group consisting of alkylene glycols, dialkylene glycols, polyalkylene glycols and glycerins, and 7 to 60% of water.

2. An ink composition according to claim 1 wherein the resin is at least one of acrylic resins, acryl-styrene copolymer resins, ethylene-vinyl acetate-vinyl chloride copolymer resins, acryl-vinyl acetate resins, carboxylated butadiene-styrene rubber and styrene resins.

3. An ink composition according to claim 1 wherein the resin has a film-forming temperature of 50° C. or higher.

4. An ink composition according to claim 1 wherein the pigment accounts for 5 to 30%, the resin for 10 to 45%, the organic solvent for 10 to 30% and the water for 7 to 60% in the whole weight of the ink composition.

5. An ink composition erasable with a rubber eraser after writing, the composition comprising, based on the weight of the ink composition, 2 to 90% of a pigment coated with a water insoluble resin having a film-forming temperature of 40° C. or higher, 0.5 to 30% of at least one organic solvent selected from the group consisting of alkylene glycols, dialkylene glycols, polyalkylene glycols and glycerins, and 0.5 to 30% of water.

6. An ink composition according to claim 5 wherein the resin is at least one of acrylic resins, acryl-styrene copolymer resins, ethylene-vinyl acetate-vinyl chloride copolymer resins, acryl-vinyl acetate resins, carboxylated butadiene-styrene rubber and styrene resins.

7. An ink composition according to claim 5 wherein the resin used for coating the pigment has a film-forming temperature of 50° C. or higher.

8. An ink composition according to claim 5 wherein the pigment and the resin are present in a ratio of 40-95 : 60-5 of the former to the latter in 100 parts of the resin-coated pigment.

9. An ink composition according to claim 5 wherein the particles of resin-coated pigment have a mean particle size of 0.1 to 10 $\mu$m.

10. An ink composition according to claim 5 wherein the resin-coated pigment accounts for 10 to 70%, the organic solvent for 1 to 20% and the water for 0.5 to 30% in the whole weight of the ink composition.

11. An ink composition erasable with a rubber eraser after writing, the composition comprising, based on the weight of the ink composition, 2 to 90% of a pigment coated with a water insoluble resin having a film-forming temperature of 40° C. or higher, 1.5 to 55% of water insoluble emulsion (calculated as solids), 0.5 to 30% of at least one organic solvent selected from the group consisting of alkylene glycols, dialkylene glycols, polyalkylene glycols and glycerins, and 4.0 to 60% of water.

12. An ink composition according to claim 11 wherein the resin is at least one of acrylic resins, acryl-styrene copolymer resins, ethylene-vinyl acetate-vinyl chloride copolymer resins, acryl-vinyl acetate resins, carboxylated butadiene-styrene rubber and styrene resins.

13. An ink composition according to claim 11 wherein the pigment and the resin are present in a ratio of 40-95 : 60-5 of the former to the latter in 100 parts of the resin-coated pigment.

14. An ink composition according to claim 11 wherein the particles of resin-coated pigment have a mean particle size of 0.1 to 10 $\mu$m.

15. An ink composition according to claim 11 wherein the resin-coated pigment accounts for 10 to 70%, the emulsion for 2 to 50% (calculated as solids), the organic solvent for 0.5 to 30% and the water for 4 to 60%.

* * * * *